(12) United States Patent
Chang et al.

(10) Patent No.: US 6,744,520 B2
(45) Date of Patent: Jun. 1, 2004

(54) METHOD FOR MEASURING TWO-DIMENSIONAL DISPLACEMENT USING CONJUGATE OPTICS

(75) Inventors: Chung-Chu Chang, HsinChu (TW); Ching-Fen Kao, HsinChu (TW); Chih-Kung Lee, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 296 days.

(21) Appl. No.: 10/086,566

(22) Filed: Mar. 4, 2002

(65) Prior Publication Data

US 2003/0164950 A1 Sep. 4, 2003

(51) Int. Cl.$^7$ .................................................. G01B 9/02
(52) U.S. Cl. .................... 356/499; 356/521; 356/500
(58) Field of Search .............................. 356/450, 496, 356/498, 499, 500, 521

(56) References Cited

U.S. PATENT DOCUMENTS

| | | | |
|---|---|---|---|
| 3,756,723 A | * | 9/1973 | Hock .......................... 356/400 |
| 3,822,942 A | * | 7/1974 | Hock .......................... 356/492 |
| 5,204,524 A | | 4/1993 | Ichikawa et al. |
| 5,424,833 A | | 6/1995 | Huber et al. |
| 5,450,199 A | * | 9/1995 | Rieder ......................... 356/499 |
| 5,493,397 A | * | 2/1996 | Huber et al. ................. 356/482 |
| 5,530,543 A | | 6/1996 | Hercher |
| 5,666,196 A | * | 9/1997 | Ishii et al. ................... 356/499 |

* cited by examiner

Primary Examiner—Frank G. Font
Assistant Examiner—Andrew H. Lee
(74) Attorney, Agent, or Firm—Birch, Stewart, Kolasch & Birch, LLP

(57) ABSTRACT

A method for measuring two-dimensional displacement using conjugate optics comprises the steps of emitting an incident beam onto a diffraction element to generate many firstly diffracted beams, selecting two axially symmetric beams of the same order of diffraction from the firstly diffracted beams, introducing corresponding sets of wavefront reconstruction optics to reflect the two selected beams back onto the same incident spot along the same optical paths and to generate many secondly diffracted beams, selecting two axially symmetric pairs of beams of the same order of diffraction from the secondly diffracted beams, forming two interference fringes by superposing the two selected pairs of beams via corresponding mirrors and interferometric optics, and obtaining two linearly independent displacements of the diffraction element relative to the rest of the optics by decoding the two interference fringes.

18 Claims, 8 Drawing Sheets

METHOD FOR MEASURING TWO-DIMENSIONAL DISPLACEMENT USING CONJUGATE OPTICS

BACKGROUND OF THE INVENTION

1. Field of the Invention

The invention relates to a method for measuring two-dimensional displacement using conjugate optics, wherein the term, conjugate optics, implies the adoption of the wavefront reconstruction optics and the optics of the telecentric system.

2. Description of the Related Art

A pair of one-dimensional scales in cross-type configuration is ordinarily used to measure two-dimensional displacement. The setup of such a system involves a sequence of alignment steps, one of the most important of which is the alignment for orthogonality, which becomes more difficult as the precision requirement of the system increases. Good technical skills are needed to operate such a system, resulting in a high training cost and significant operator dependence. Recently, planar scales have been designed and developed for the same measuring purpose. This novel instrumentation concept avoids the difficulties of its predecessors.

U.S. Pat. No. 5,204,524 discloses a design of planar scales. The design is rooted in the theory of geometrical optics and intrinsically constrains the precision and resolution of the system.

U.S. Pat. No. 5,424,833 discloses another design of planar scales. In this design, the light beam is diffracted three times by diffraction gratings. The light intensity is thus greatly reduced, and so is the signal to noise ratio. Consequently, in order to build such a system, it is necessary to use better optical components and to ask for stricter assembly tolerances.

U.S. Pat. No. 5,530,543 discloses another design of planar scales that utilizes a single diffraction grating. However, this design compensates for no misalignment, and the output signal is therefore fragile under motion.

SUMMARY OF THE INVENTION

The submitted invention proposes a new design of planar scales to resolve the problems mentioned above.

The design uses conjugate optics and is comprised of the following steps. A light source emits a light beam vertically onto a diffraction element; many firstly diffracted beams a regenerated, and at least two of them are reflected along the same optical paths back onto the said diffraction element via corresponding sets of wavefront reconstruction optics; many secondly diffracted beams are generated, of which at least two pairs are respectively superposed by corresponding sets of mirrors and interferometric optics to form interference fringes; two linearly independent displacements of the diffraction element are then obtained by decoding the interference fringes.

The invention has the advantage of providing high tolerances to both the alignment of the optics and the manufacture of the diffraction element. Both the manufacturing and the assembling costs are reduced, and yield is increased.

BRIEF DESCRIPTION OF THE DRAWINGS

The aforementioned and other objectives and features of the invention are clarified in the following description, with reference to the following drawings and the preferred embodiments.

DETAILED DESCRIPTION OF THE PREFERRED EMBODIMENTS

First Embodiment

Figure 1:
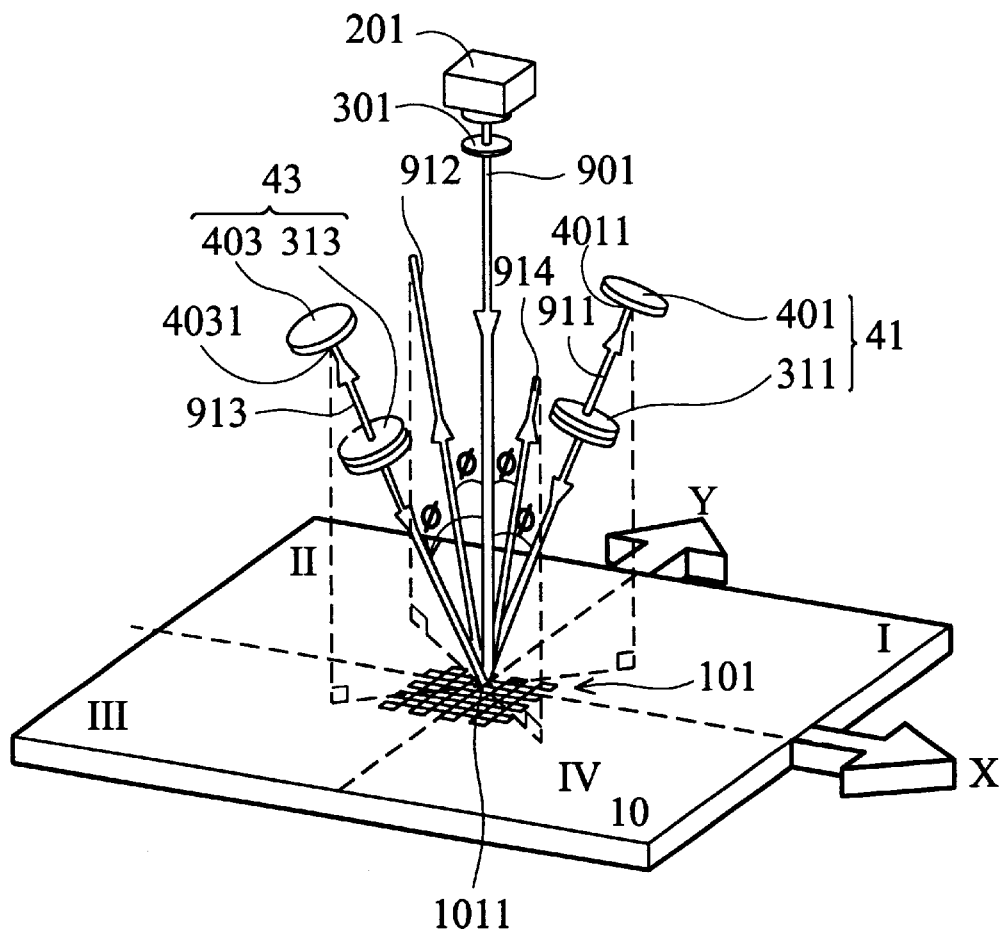
FIG. 1 schematically shows the first part of the optical design of the first embodiment of the invention.

FIG. 1 schematically shows the first part of the optical design of the first embodiment of the invention. A beam, 901, is either first emitted from a light source, 201, before passing through a collimating lens, 301, or directly emitted from a collimating light source, 201. The collimated beam, 901, is then incident onto a spot, 1011, on a diffraction element, 101, in an almost vertical direction. The collimated beam, 901, is hereafter referred to as the first incident beam.

As shown in FIG. 1, in the first embodiment of the invention, the diffraction element, 101, is formed on a reflective planar substrate, 10, and is a two-dimensional step-type diffraction grating with grating pitches of 4 µm in both directions and a depth of 0.2 µm. After being incident on the diffraction element, 101, the first incident beam, 901, is transferred into many firstly diffracted beams. The transfer function, which represents the functionality of the diffraction element, 101, is given by, $f(x,y) = [\exp(i2\pi kx) + \exp(-i2\pi kx)] \times [\exp(i2\pi ky) + \exp(-i2\pi ky)]$ in the X-Y plane, which is tangential to the incident spot, 1011; k is the propagation constant.

FIG. 1 presents four of the firstly diffracted beams, namely 911, 912, 913, and 914. This set of four beams is axially symmetric and all the beams are of the same order of diffraction. Their projections on the X-Y plane are in the directions, (1,1), (−1,1), (−1,−1), and (1,−1), respectively. Now, as the diffraction element, 101, moves relative to the rest of the optics along the X-Y plane, the four beams, 911, 912, 913, and 914, carry various phase shifts, namely +θx+θy, −θx+θy, −θx−θy, and +θx−θy, respectively, because of the Doppler Effect.

Next, referring to FIG. 1, an axially symmetric pair of beams, such as 911 and 913, is selected from the four beams. Furthermore, two sets of wavefront reconstruction optics, 41 and 43, are introduced in a way that both beams are reflected back onto the incident spot, 1011, along the same optical paths as their respective ones before reflection. In this embodiment, each set consists of a collimating lens and a mirror; that is, 41 consists of 311 and 401, and 43 consists of 313 and 403. In a separate embodiment, the other axially symmetric pair of beams, 912 and 914, can be used instead of 911 and 913.

FIG. 1 reveals that the optical axes of the two collimating lenses, 311 and 313, should be placed co-linearly with the optical paths of the two beams, 911 and 913, respectively; the two mirrors, 401 and 403, should be placed perpendicular to the optical axes of the two collimating lenses, 311 and 313, respectively; the incident spot, 1011, and the reflecting spot, 4011, on the mirror, 401, should respectively be located at the front and the back focal points of the collimating lens, 311; the incident spot, 1011, and the reflecting spot, 4031, on the mirror, 403, should respectively be located at the front and the back focal points of the collimating lens, 313. The two sets of wavefront reconstruction optics thus constitute the conjugate optics.

Figure 2:
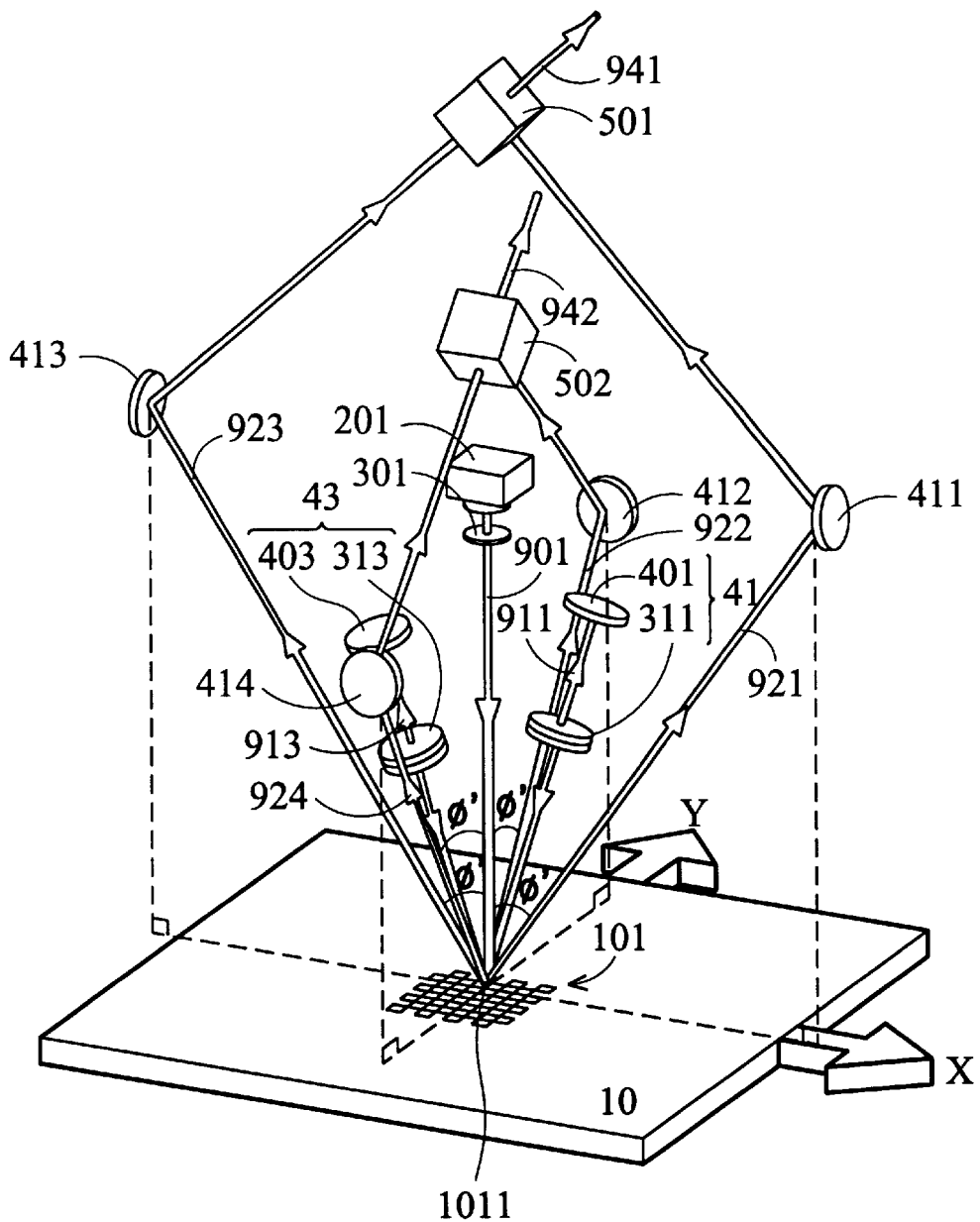
FIG. 2 schematically shows the rest of the optical design of the first embodiment of the invention.

FIG. 2 schematically shows the rest of the optical design of the first embodiment of the invention. After returning back onto the incident spot, 1011, on the diffraction element, 101, the two reflected beams are similarly transferred into many secondly diffracted beams. FIG. 2 presents four of the secondly diffracted beams, namely 921, 922, 923, and 924. This set of four beams is axially symmetric and all the beams are of the same order of diffraction. Their projections on the X-Y plane are in the directions, (1,0), (0,1), (−1,0), and (0,−1), respectively. Now, as the diffraction element, 101, moves relative to the rest of the optics along the X-Y plane, the four beams, 921, 922, 923, and 924, further carry various phase shifts, namely −2θy,−2θx, +2θy, and +2θx, because of the Doppler Effect.

FIG. 2 shows that the four selected secondly diffracted beams are grouped into two pairs. The first pair consists of 921 and 923, and in order to form an interference fringe, the pair is superposed into the beam, 941, by a pair of mirrors, 411 and 413, and a piece of interferometric optics, such as a polarizing beam splitter, 501. The interference fringe of the beam, 941, can be used to determine the Y direction displacement because the two beams, 921 and 923, carry phase shifts of −2θy and +2θy, respectively. Similarly, the second pair consists of 922 and 924, and in order to form the other interference fringe, the pair is superposed into the other beam, 942, by the other pair of mirrors, 412 and 414, and the other piece of interferometric optics, such as a polarizing beam splitter, 502. The interference fringe of the beam, 942, can be used to determine the X direction displacement because the two beams, 922 and 924, carry phase shifts of −2θx and +2θx, respectively.

Second Embodiment

Figure 3:
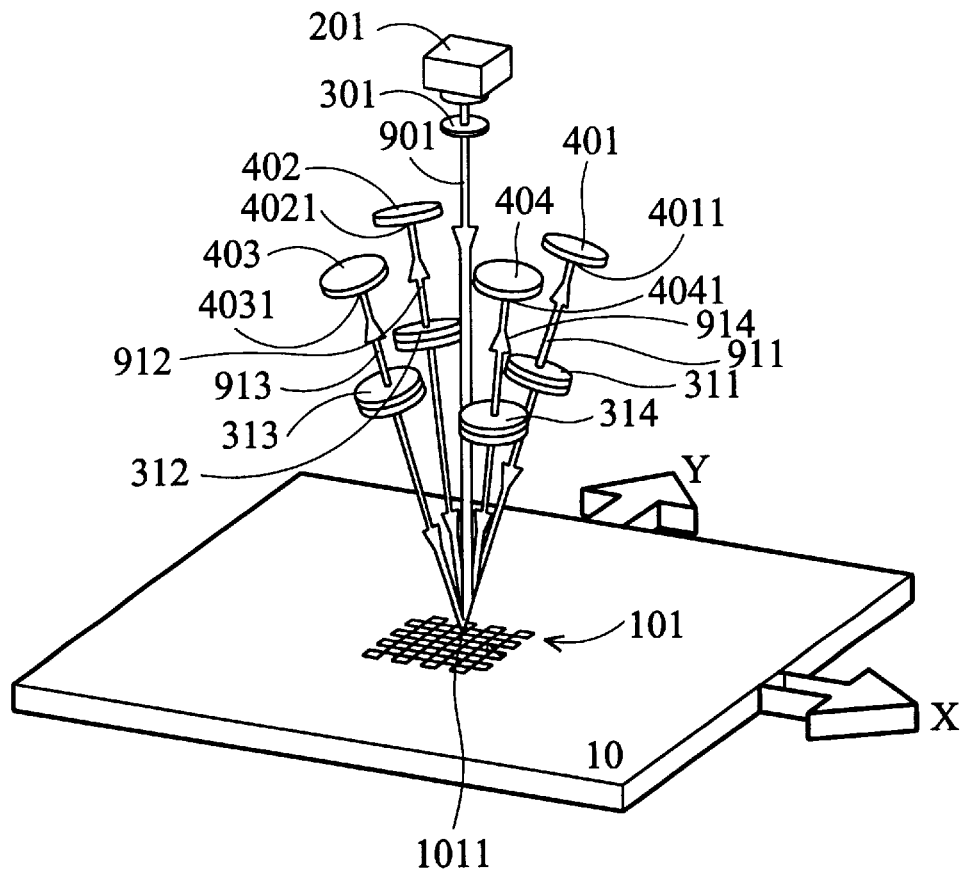
FIG. 3 schematically shows the first part of the optical design of the second embodiment of the invention.

FIG. 3 schematically shows the first part of the optical design of the second embodiment of the invention. A beam, 901, is either first emitted from a light source, 201, before passing through a collimating lens, 301, or directly emitted from a collimating light source, 201. The collimated beam, 901, is then incident onto a spot, 1011, on a diffraction element, 101, in an almost vertical direction. The collimated beam, 901, is hereafter referred to as the first incident beam.

As shown in FIG. 3, in the second embodiment of the invention, the diffraction element, 101, is formed on a reflective planar substrate, 10, and is a two-dimensional step-type diffraction grating with grating pitches of 4 μm in both directions and a depth of 0.2 μm. After being incident on the diffraction element, 101, the first incident beam, 901, is transferred into many firstly diffracted beams. The transfer function, which represents the functionality of the diffraction element, 101, is given by, f(x,y)=[exp(i2πkx)+exp(−i2πkx)]×[exp(i2πky)+exp(−i2πky)]

in the X-Y plane, which is tangential to the incident spot, 1011; k is the propagation constant.

FIG. 3 presents four of the firstly diffracted beams, namely 911, 912, 913, and 914. This set of four beams is axially symmetric and all the beams are of the same order of diffraction. Their projections on the X-Y plane are in the directions, (1,1), (−1,1), (−1,−1), and (1,−1), respectively. Now, as the diffraction element, 101, moves relative to the rest of the optics along the X-Y plane, the four beams, 911, 912, 913, and $914$, carry various phase shifts, namely +θx+θy, −θx+θy, −θx−θy, and +θx−θy, respectively, because of the Doppler Effect.

Next, referring to FIG. 3, four sets of wavefront reconstruction optics, 41, 42, 43, and 44, are introduced in a way that the four beams are reflected back onto the incident spot, 1011, along the same optical paths as their respective ones before reflection. In this embodiment, each set consists of a collimating lens and a mirror; that is, 41 consists of 311 and 401, 42 consists of 312 and 402, 43 consists of 313 and 403, and 44 consists of 314 and 404.

FIG. 3 reveals that the optical axes of the four collimating lenses, 311, 312, 313, and 314, should be placed co-linearly with the optical paths of the four beams, 911, 912, 913, and 914, respectively; the four mirrors, 401, 402, 403, and 404, should be placed perpendicular to the optical axes of the four collimating lenses, 311, 312, 313, and 314, respectively; the incident spot, 1011, and the reflecting spot, 4011, on the mirror, 401, should respectively be located at the front and the back focal points of the collimating lens, 311; the incident spot, 1011, and the reflecting spot, 4021, on the mirror, 402, should respectively be located at the front and the back focal points of the collimating lens, 312; and so on. The four sets of wavefront reconstruction optics thus constitute the conjugate optics.

Figure 4:
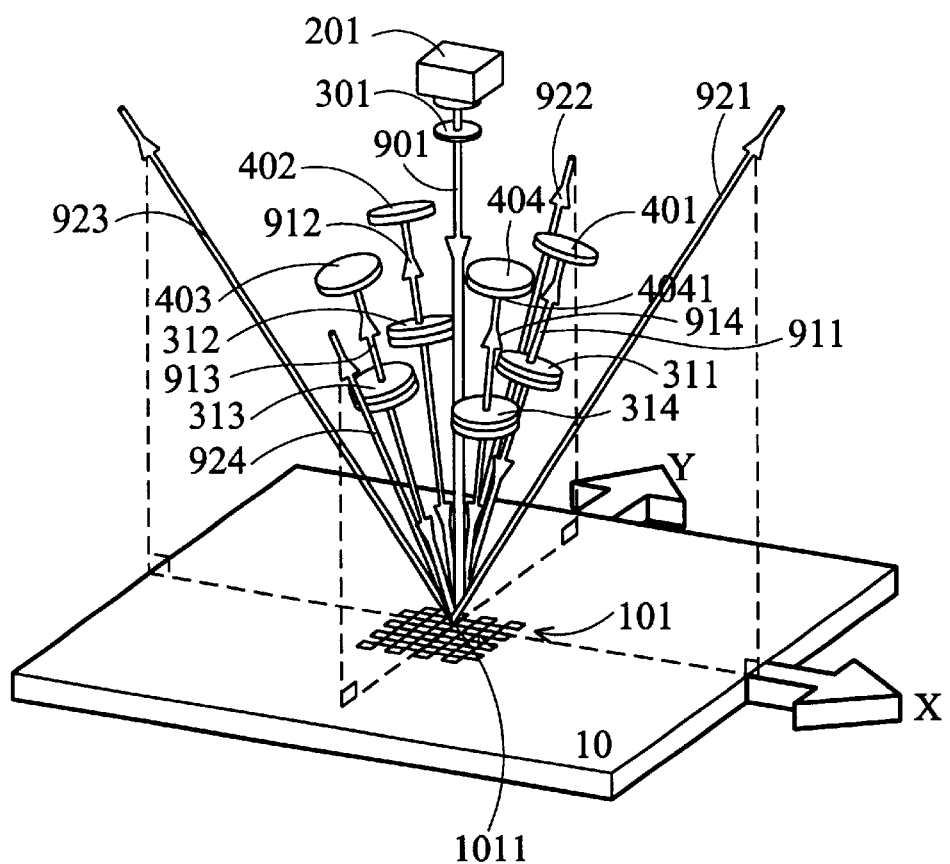
FIG. 4 schematically shows the rest of the optical design of the second embodiment of the invention.

FIG. 4 schematically shows the rest of the optical design of the second embodiment of the invention. After returning back onto the incident spot, 1011, on the diffraction element, 101, the four reflected beams are similarly transferred into many secondly diffracted beams. FIG. 4 presents four of the secondly diffracted beams, namely 921, 922, 923, and 924. This set of four beams is axially symmetric and all the beams are of the same order of diffraction. Their projections on the X-Y plane are in the directions, (1,0), (0,1), (−1,0), and (0,−1), respectively. Furthermore, each of the four beams is a superposition of two beams. For example, 921 is a superposition of two secondly diffracted beams transferred from 912 and 913; 922 is a superposition of two secondly diffracted beams transferred from 913 and 914; and so on. Now, as the diffraction element, 101, moves relative to the rest of the optics along the X-Y plane, the four beams, 921, 922, 923, and 924, thereby carry interference fringes, because of the Doppler Effect, and can be used to determine either the Y direction displacement or the X direction displacement. For example, 921 and 923 can be used to determine the Y direction displacement, and similarly, 922 and 924 can be used to determine the X direction displacement.

Figure 5:
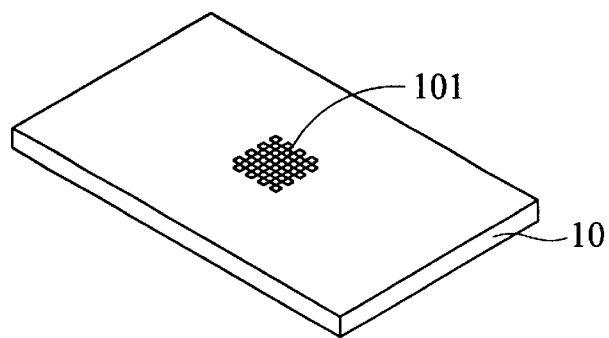
FIG. 5 schematically shows the diffraction element formed on a planar substrate.
Figure 6:
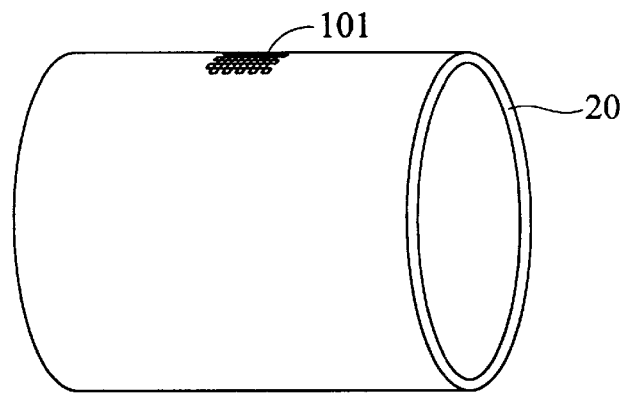
FIG. 6 schematically shows the diffraction element formed on a cylindrical substrate.
Figure 7:
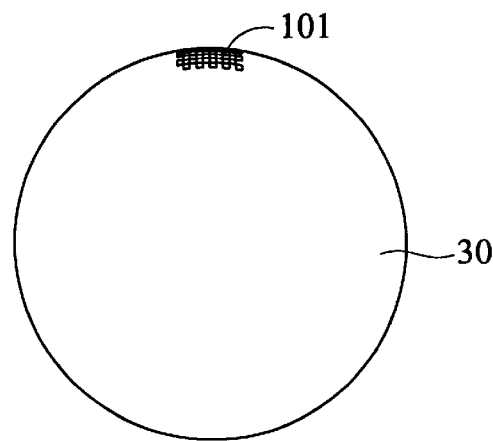
FIG. 7 schematically shows the diffraction element formed on a spherical substrate.

FIG. 5 schematically shows the diffraction element formed on a planar substrate. FIG. 6 schematically shows the diffraction element formed on a cylindrical substrate. FIG. 7 schematically shows the diffraction element formed on a spherical substrate. Referring to FIGS. 5 to 7, the diffraction element, 101, can be formed on a planar substrate, 10, a cylindrical substrate, 20, or a spherical substrate, 30.

Figure 8:
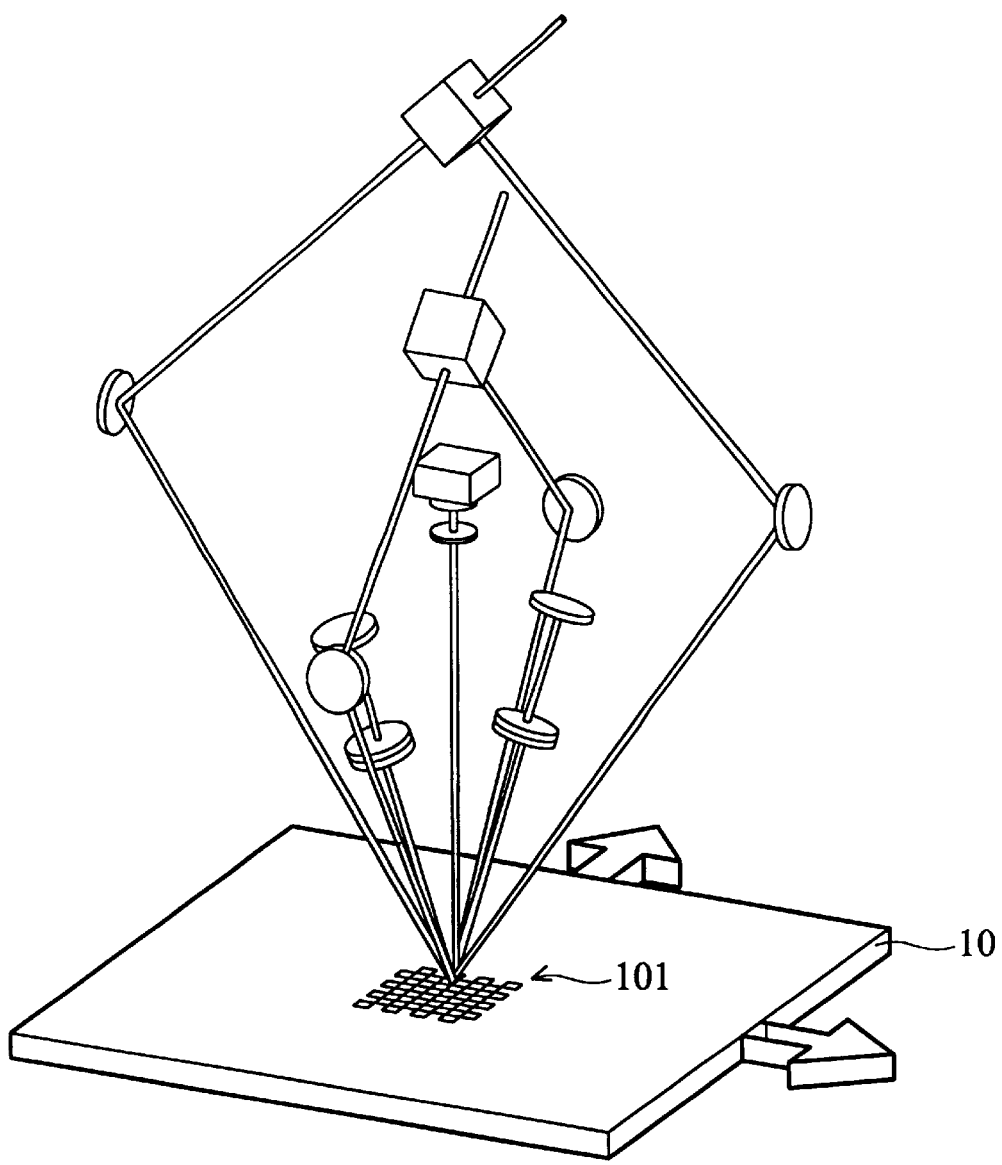
FIG. 8 schematically shows the diffraction element formed on a reflective substrate.
Figure 9:
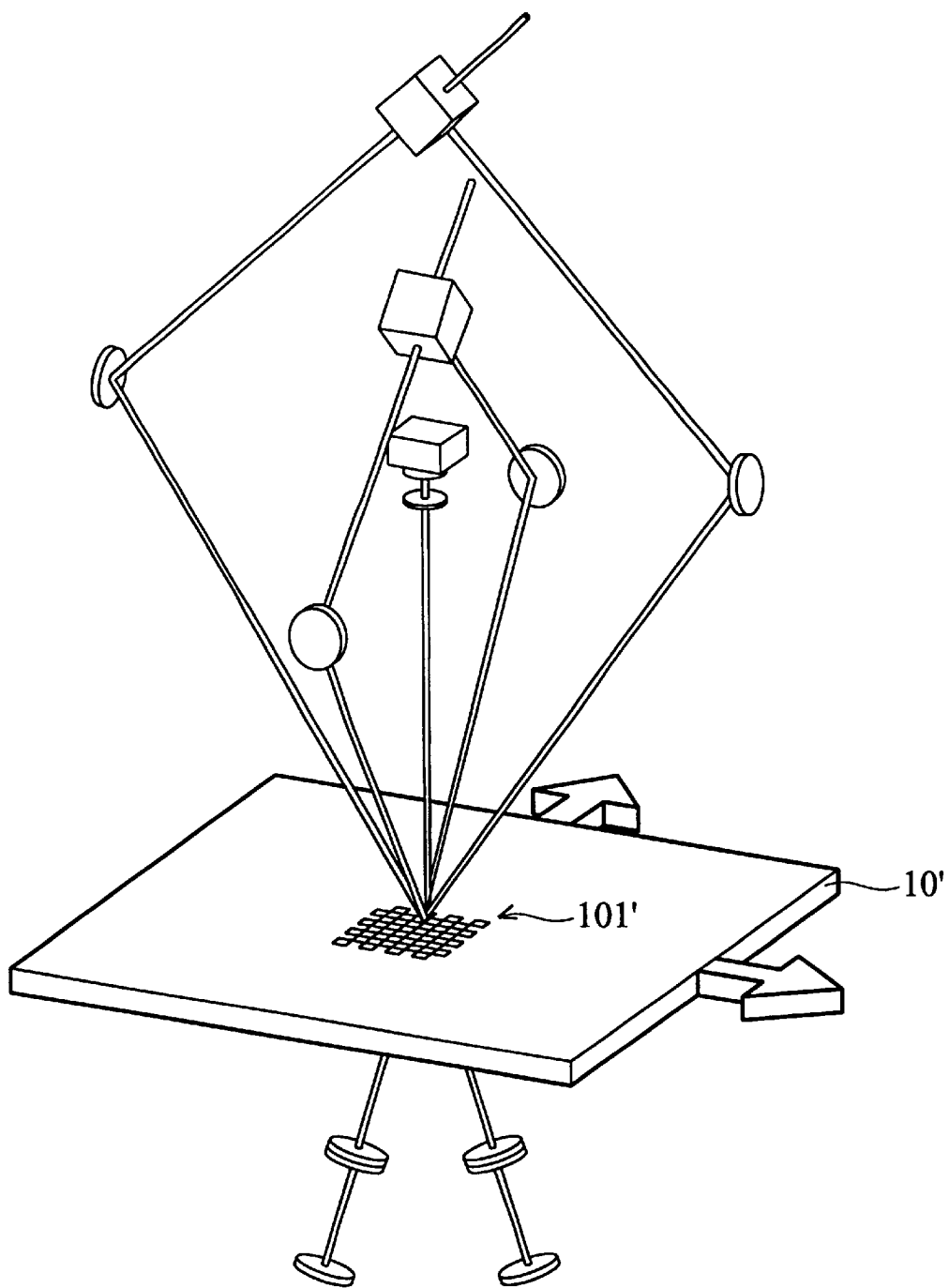
FIG. 9 schematically shows the diffraction element formed on a transmitting substrate.

FIG. 8 schematically shows the implementation of the present invention using a reflective substrate. As shown in the figure, the diffraction element, 101, is formed on a reflective substrate, 10, and therefore the diffraction element, 101, is of the reflective type. FIG. 9 schematically shows the implementation of the present invention using a transmitting substrate. As shown in the figure, the diffraction element is formed on a transmitting substrate, 10', and therefore the diffraction element, 101, is of the transmitting type.

Figure 10:
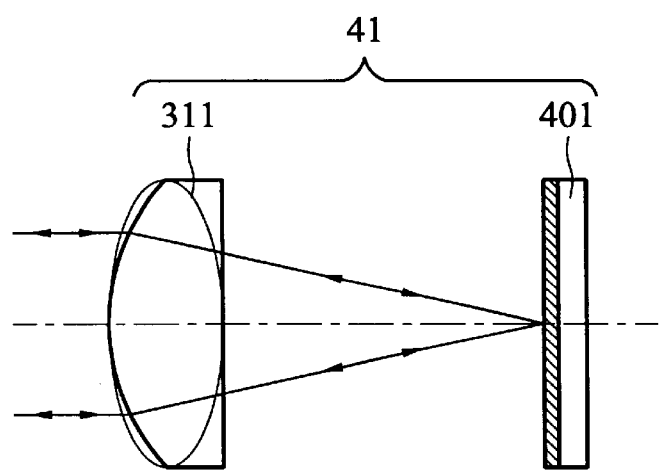
FIGS. 10 to 12 schematically show many kinds of wavefront reconstruction optics.
Figure 11:
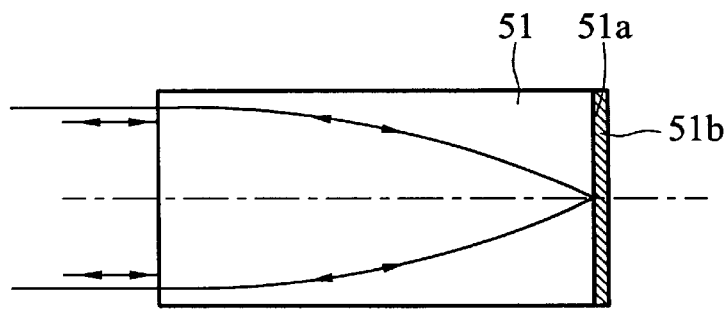
Figure 12:
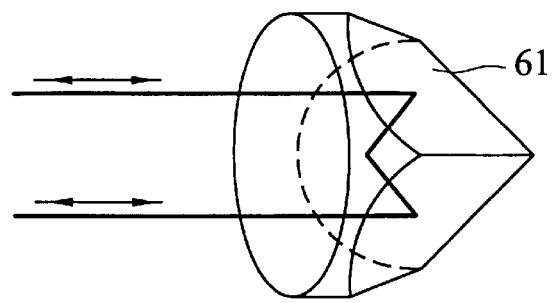

FIGS. 10 to 12 schematically show various kinds of wavefront reconstruction optics, such as a module 41, a GRIN lens 51, or a corner cube 61. The module 41 is composed of a collimating lens 311 and a mirror 401; the GRIN lens 51 has a reflecting film 51b on its end surface 51a.

The wavefront reconstruction optics nicely directs the light beam to be diffracted twice at a single optical spot. The term, conjugate optics, is adopted because the back and forth optical aberrations are automatically compensated for each other according to the Fourier transform pair. Consequently, the tolerances of the measuring system are improved.

The light source, 201, emits a light beam that is either coherent or partially coherent, and whose polarization can be linear, circular, or elliptical.

Although the preferred embodiments of the present invention have been specified, it is to be understood that any modification apparent to those skilled in the art does not depart from the spirit of the present invention. The scope of the invention is therefore to be determined solely by the following claims.

What is claimed is:

1. A method for measuring two-dimensional displacement using conjugate optics, comprising the following steps—
    emitting an incident beam from a light source;
    generating firstly diffracted beams by emitting the incident beam onto a diffraction element;
    selecting an axially symmetric pair of beams from the firstly diffracted beams, where the two beams are of the same order of diffraction;
    introducing corresponding sets of wavefront reconstruction optics so as to reflect the two selected firstly diffracted beams back along the same optical paths;
    generating secondly diffracted beams by emitting the two reflected beams back onto the same incident spot on the said diffraction element;
    selecting two axially symmetric pairs of beams from the secondly diffracted beams, where the two pairs amount to a total of four beams which are of the same order of diffraction and the set of which is axially symmetric;
    forming a first interference fringe by superposing the first pair of the selected secondly diffracted beams via mirrors and interferometric optics, and similarly, forming a second interference fringe by superposing the second pair of the selected secondly diffracted beams via other mirrors and interferometric optics;
    obtaining two linearly independent displacements of the diffraction element relative to the rest of the optics, mentioned in this claim, by decoding the two interference fringes.

2. A method for measuring two-dimensional displacement using conjugate optics, as claimed in claim 1, wherein the incident beam is coherent and is one of a group that consists of a linearly-polarized light beam, a circularly-polarized light beam, and an elliptically-polarized light beam.

3. A method for measuring two-dimensional displacement using conjugate optics, as claimed in claim 1, wherein the incident beam is partially coherent and is one of a group that consists of a linearly-polarized light beam, a circularly-polarized light beam, and an elliptically-polarized light beam.

4. A method for measuring two-dimensional displacement using conjugate optics, as claimed in claim 1, wherein the light source further comprises a collimating lens.

5. A method for measuring two-dimensional displacement using conjugate optics, as claimed in claim 1, wherein the incident beam is incident onto the diffraction element at an almost normal angle.

6. A method for measuring two-dimensional displacement using conjugate optics, as claimed in claim 1, wherein the diffraction element is formed on one of a group that consists of a planar substrate, a cylindrical substrate, and a spherical substrate.

7. A method for measuring two-dimensional displacement using conjugate optics, as claimed in claim 1, wherein the type of diffraction element is one of a group that consists of a reflective type and a transmitting type.

8. A method for measuring two-dimensional displacement using conjugate optics, as claimed in claim 1, wherein the kind of wavefront reconstruction optics is one of a group that consists of a module that includes a collimating lens and a mirror, a GRIN lens with a reflecting film on its end surface, and a corner cube.

9. A method for measuring two-dimensional displacement using conjugate optics, as claimed in claim 8, wherein the reflecting spot on the mirror is located at one focal point of the collimating lens and the diffraction spot on the diffraction element is located at the other focal point of the collimating lens.

10. A method for measuring two-dimensional displacement using conjugate optics, comprising the following steps—
    emitting an incident beam from a light source;
    generating firstly diffracted beams by emitting the incident beam onto a diffraction element;
    selecting four axially symmetric beams from the firstly diffracted beams, wherein the four beams are of the same order of diffraction;
    introducing corresponding sets of wavefront reconstruction optics so as to reflect the four selected firstly diffracted beams back along the same optical paths;
    generating secondly diffracted beams by emitting the four reflected beams back onto the same incident spot on the said diffraction element;
    selecting four axially symmetric beams from the secondly diffracted beams, wherein the four beams are of the same order of diffraction;
    obtaining two linearly independent displacements of the diffraction element relative to the rest of the optics, mentioned in this claim, by decoding the interference fringes of at least two adjacent beams of the four selected secondly diffracted beams.

11. A method for measuring two-dimensional displacement using conjugate optics, as claimed in claim 10, wherein the incident beam is coherent and is one of a group that consists of a linearly-polarized light beam, a circularly-polarized light beam, and an elliptically-polarized light beam.

12. A method for measuring two-dimensional displacement using conjugate optics, as claimed in claim 10, wherein the incident beam is partially coherent and is one of a group that consists of a linearly-polarized light beam, a circularly-polarized light beam, and an elliptically-polarized light beam.

13. A method for measuring two-dimensional displacement using conjugate optics, as claimed in claim 10, wherein the light source further comprises a collimating lens.

14. A method for measuring two-dimensional displacement using conjugate optics, as claimed in claim 10, wherein the incident beam is incident onto the diffraction element at an almost normal angle.

15. A method for measuring two-dimensional displacement using conjugate optics, as claimed in claim 10, wherein the diffraction element is formed on one of a group that consists of a planar substrate, a cylindrical substrate, and a spherical substrate.

16. A method for measuring two-dimensional displacement using conjugate optics, as claimed in claim 10, wherein the type of diffraction element is one of a group consists of a reflective type and a transmitting type.

17. A method for measuring two-dimensional displacement using conjugate optics, as claimed in claim 10, wherein the kind of wavefront reconstruction optics is one of a group that consists of a module that includes a collimating lens and a mirror, a GRIN lens with a reflecting film on its end surface, and a corner cube.

18. A method for measuring two-dimensional displacement using conjugate optics, as claimed in claim 17, wherein the reflecting spot on the mirror is located at one focal point of the collimating lens and the diffraction spot on the diffraction element is located at the other focal point of the collimating lens.

* * * * *